(12) United States Patent
Hogg et al.

(10) Patent No.: US 7,487,498 B2
(45) Date of Patent: Feb. 3, 2009

(54) STRATEGY FOR REFERENCING CODE RESOURCES

(75) Inventors: James H. Hogg, Bellevue, WA (US); William G. Evans, Redmond, WA (US); Suzanne M. Cook, Redmond, WA (US); Sean E. Trowbridge, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 772 days.

(21) Appl. No.: 10/706,684

(22) Filed: Nov. 12, 2003

(65) Prior Publication Data

US 2005/0102649 A1    May 12, 2005

(51) Int. Cl.
*G06F 9/45* (2006.01)
(52) U.S. Cl. .................................... 717/162
(58) Field of Classification Search ................ 717/162
See application file for complete search history.

(56) References Cited

U.S. PATENT DOCUMENTS

| | | | | |
|---|---|---|---|---|
| 5,381,547 | A * | 1/1995 | Flug et al. .................... | 719/331 |
| 5,539,896 | A * | 7/1996 | Lisle ........................... | 711/150 |
| 5,551,015 | A * | 8/1996 | Goettelmann et al. ....... | 717/137 |
| 6,542,167 | B1 * | 4/2003 | Darlet et al. ................. | 715/762 |
| 6,725,335 | B2 * | 4/2004 | Bala et al. .................... | 711/125 |
| 7,058,929 | B2 * | 6/2006 | Charnell et al. .............. | 717/135 |
| 7,069,549 | B2 * | 6/2006 | Charnell et al. .............. | 717/158 |
| 2002/0013938 | A1 * | 1/2002 | Duesterwald et al. .......... | 717/9 |
| 2002/0016800 | A1 * | 2/2002 | Spivak et al. ................ | 707/523 |
| 2002/0161996 | A1 | 10/2002 | Koved et al. | |
| 2003/0154239 | A1 | 8/2003 | Davis et al. | |
| 2004/0010779 | A1 * | 1/2004 | Di Loreto .................... | 717/139 |
| 2005/0021754 | A1 * | 1/2005 | Alda et al. ................... | 709/225 |
| 2005/0021788 | A1 | 1/2005 | Tucker et al. | |
| 2005/0071824 | A1 * | 3/2005 | K. N. et al. .................. | 717/138 |

OTHER PUBLICATIONS

.NET Development Introductory page, MSDN technical library, accessed on Feb. 4, 2004, accessible at <http://msdn.microsoft.com/library/default.asp>.
Platt, David S., "Introducing Microsoft .NET," Microsoft Press, 2003, pp. 13-35.
Newkirk, James et al., "How .NET's Custom Attributes Affect Design," IEEE Software, vol. 19, No. 5, Sep.-Oct. 2002, p. 18-20.
Liberty, Jesse, Programming C#, O-Reilly Publications, Jul. 2001, Chapter 18, accessible at <http://www.oreilly.com/catalog/progcsharp/chapter/ch18.html>, online pp. 1-7.

(Continued)

*Primary Examiner*—John Chavis
(74) *Attorney, Agent, or Firm*—Lee & Hayes, PLLC

(57) ABSTRACT

A strategy is described for assisting a supplier in updating code without negatively impacting preexisting applications that may interact with the original or updated code. In this strategy, a resource is transferred from a first code module to a second code module. So that the applications that utilize the resource can continue to access this resource, the strategy adds forwarding information to a new version of the first code module. The forwarding information provides a note which shows the Common Language Runtime (CLR) where to find the specified resource when the code modules are executed.

10 Claims, 11 Drawing Sheets

OTHER PUBLICATIONS

Visual C# Language Concepts, "Building from the Command Line," Microsoft Corporation MSDN Library, accessible at <http://msdn.microsoft.com/library/default.asp?url=/library/en-us/cscomp/html/vcgrfBuildingFromCommandLine.asp>, accessed on Dec. 30, 2003, 2 pages.

Microsoft C++ Language Reference for embedded Visual C++, "Friends," Microsoft Corporation MSDN Library, accessible at <http://msdn.microsoft.com/library/default.asp?url=/library/en-us/dv_vccelng4/html/ellrffriends.asp>, accessed on Dec. 29, 2003, 1 page.

Liberty, "Programming C#," O-Reilly Publications, Jul. 2001, Chapter 18, also accessible at <http://www.oreilly.com/catalog/progcsharp/chapter/ch18.html >, online pp. 1-7.

Newkirk et al., "Now.Net's Custom Attributes Affect Design", IEEE Software, vol. 19, No. 5, Sep.-Oct. 2002, pp. 18-20.

Platt, "Introducing Microsoft.NET," Microsoft Press, Redmond, Washington, 2003, pp. 13-25.

Rector, "Giving a .NET Assembly a Strong Name," available at <http://www.developer.com/net/cplus/article.php/3292231>, accessed on Dec. 31, 2003, 5 pages.

NET Framework Developer's Guide, "Strong-Named Assemblies," Microsoft Corporation MSDN Library, accessible at <http://msdn.microsoft.com/library/default.asp?url=/library/en-us/cpguide/html/cpconStrong-NamedAssemblies.asp>, accessed on Dec. 29, 2003, 1 page.

Watkins, et al., "An Overview of Security in the .NET Framework," Microsoft Corporation MSDN Library, accessible at <http://msdn.microsoft.com/library/default.asp?url=/library/en-us/dnnetsec/html/netframesecover.asp>, accessed on Dec. 29, 2003, 16 pages.

* cited by examiner

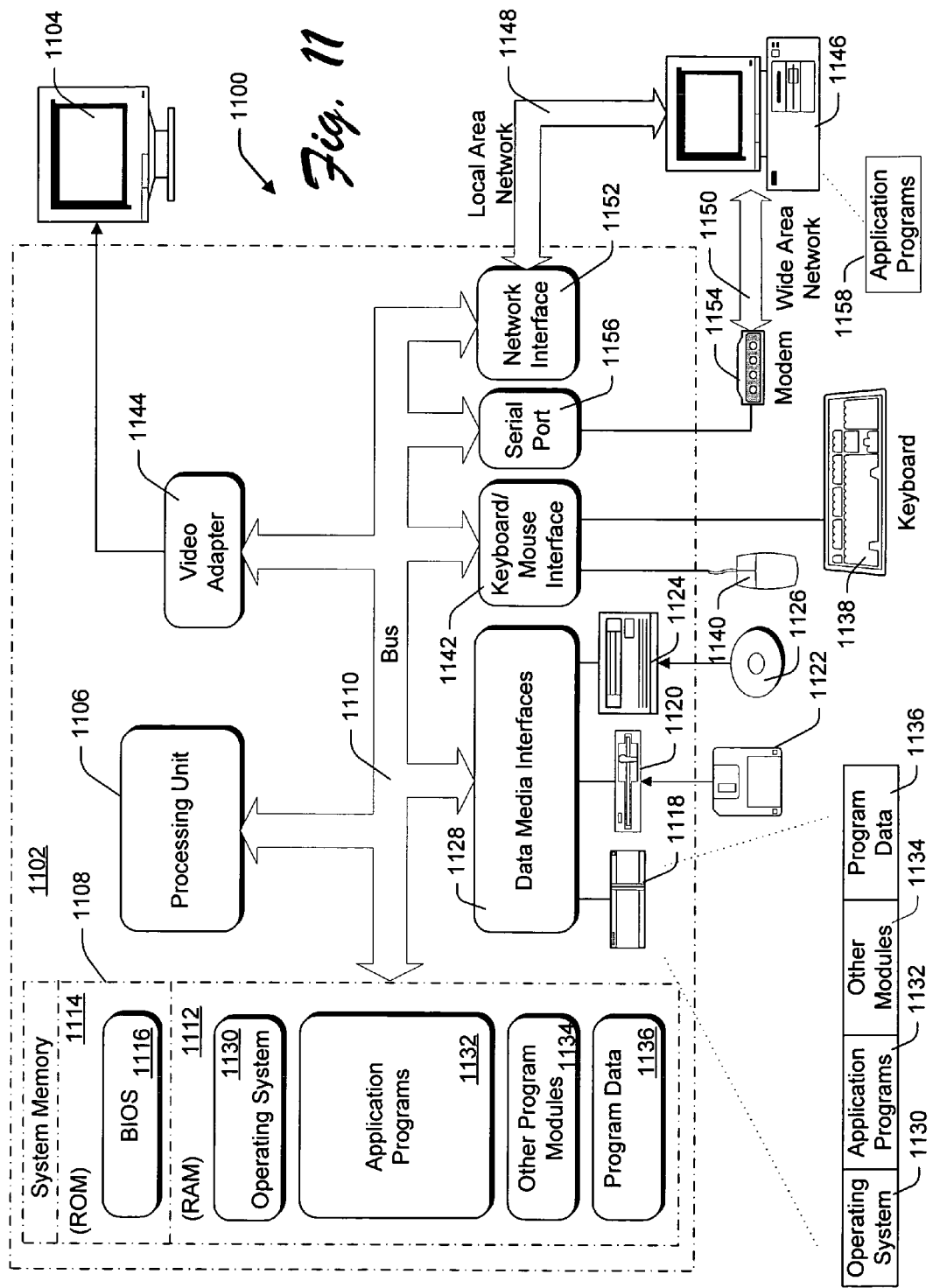

STRATEGY FOR REFERENCING CODE RESOURCES

TECHNICAL FIELD

This subject matter relates to a strategy for linking modules of code together, and, in a more particular implementation, to a strategy for linking modules of code together in a virtual machine environment.

BACKGROUND

A virtual machine (VM) environment executes programs in a manner which is generally independent of the underlying complexities in the platform used to implement the execution. Microsoft Corporation's .NET Framework (provided by Microsoft Corporation of Redmond, Wash.) provides a virtual machine environment with its Common Language Runtime (CLR) functionality. Sun's Java (provided by Sun Microsystems, Inc. of Santa Clara, Calif.) provides another well known virtual machine environment.

FIG. 1 shows an overview of the operation of an exemplary architecture 100 employed by the NET Framework in generating and executing code. The architecture 100 enables a series of actions 102 used to generate intermediate language (IL) code, and another series of actions 104 for executing that intermediate language code in a specific computing platform.

To begin with, source code 106 (such as program "Application.cs") is fed to a compiler 108. The source code can be written in a variety of languages that target the .NET Framework, such as C#, Visual Basic.NET, JScript.NET, C++ with Managed Extensions, and so on. The architecture 100 can use different kinds of compilers depending on the language used to create the source code 106. For instance, FIG. 1 shows the exemplary use of a C# compiler 108 to transform a source program written in C#.

The compiler 108 produces the intermediate language (IL) code and metadata 110. This IL is expressed in a common coding framework regardless of the language that was used to create the original source code 106. Metadata provides descriptive information regarding the IL. In general, the common coding framework provided by the IL and the metadata 110 are specifically tailored to make use of the common resources of the .NET Framework environment, and, in particular, to make use of the CLR. Code that is built to utilize the CLR is referred to as "managed code."

A key resource provided by the CLR is its use of a common set of programming types via a Common Type System (CTS). Generally, a type pertains to rules used to interpret information in the source code. CTS specifies a variety of types, including classes, interfaces, arrays, delegates, etc. A class refers to a collection that can include methods, properties, and events. An interface also refers to a collection that can include methods, properties, and events; interfaces differ from classes in that they specify software contracts, without implementation. An array refers to a collection of values having the same type. A delegate refers to a link to a method. The above-mentioned metadata generated by the compiler 108 provides descriptive information pertaining to these types, such as the name of the type, the visibility of the type (e.g., "public" or "assembly"), the identity of any interfaces which the type references, the identity of any methods implemented by the types, and so on. Additional information regarding the basics of the .NET Framework can be found in a number of introductory texts, such as Pratt, *Introducing Microsoft .NET*, Third Edition, Microsoft Press, 2003.

In the execution phase 104, the architecture 100 uses a CLR loader and a just-in-time (JIT) compiler (i.e., the "loader/JIT" component) 112 to transform the IL and metadata 110 into the native code 114 specific to a particular execution platform. More specifically, the loader/JIT component 112 produces the actual machine code that will run on an execution platform (e.g., a specific computing machine). The compilation process provided by the loader/JIT component 112 is referred to as "just-in-time" because the compilation generally takes place just prior to the execution of the code.

The use of a common programming framework provided by the .NET environment (or related environments) enables diverse systems to interact with each other by sharing modules of code between themselves, and is therefore particularly advantageous in a wide-area network environment, such as the Internet. However, this modular approach can also introduce various technical challenges.

Consider, for example, the scenario shown in FIG. 2. This figure shows an exemplary interaction between a supplier 202 of software products and a customer 204 i.e., the recipient of such software products). In event 206, the supplier ships a software module referred to as LibraryOld.dll 208 to the customer. The suffix "dll" represents "dynamic linked library." A dll typically contains a collection of data and/or executable functions that can be utilized by another program in performing specified tasks. For instance, FIG. 2 shows that the LibraryOld.dll 208 contains the definition of at least one class identified as "Aa.Bb.Cc." As noted above, in the .NET environment, a class includes a collection of fields, methods, events, and properties. The prefix "Aa.Bb" identifies the namespace of this class. A namespace is a logical naming scheme for grouping related types. The .NET Framework uses a hierarchical naming scheme for grouping types into logical categories of related functionality.

In event 210, the customer who receives the LibraryOld.dll 208 builds a program Appln.exe 212 that utilizes the resources of the LibraryOld.dll 208. For instance, LibraryOld.dll 208 might provide a collection of data and resources that allow a customer to interact with a payroll system of a company. The Appln.exe program 212 might provide a general shell for handling various administrative tasks within the company that uses LibraryOld.dll 308 as a component part thereof. FIG. 2 specifically shows that the Appln.exe program 212 contains a reference 214 (e.g., a TypeRef reference) to the class Aa.Bb.Ca in LibraryOld.dll 208. This reference can be specified in the metadata produced by the compiler 108 shown in FIG. 1

In event 216, the supplier may modify LibraryOld.dll 208 to produce a new code module, LibrayNew.dll 218. For instance, in one case, the software module LibraryOld.dll 208 may have grown very large over successive updates, and the supplier now wishes to cull a certain collection of resources (e.g., type definitions) from the LibraryOld.dll 208 and store them in the new software module LibraryNew.dll 218. Suppose, in this example, that the supplier specifically moves the class Aa.Bb.Cc from LibraryOld.dll 208 to LibraryNew.dll 218, and then ships LibraryNew.dll 218 to the customer.

Event 220 illustrates the consequences of shipping LibraryNew.dll 218 to the customer. Namely, Appln.exe 212 still references LibraryOld.dll 208. Therefore, Appln.exe 212 will continue to interact with the resources provided by LibraryOld.dll 208, essentially ignoring any upgrade provided in LibraryNew.dll 218. The customer thereby foregoes any performance improvement provided by LibraryNew.dll 218.

To fix this problem, the customer is forced to modify the Appln.exe program 212 to ensure that it properly references LibraryNew.dll 212. This can entail a significant amount of effort, particularly in those cases involving corporations, government departments, or similar environments. These environments potentially have thousands of users, spread across many sites. The modify and rebuild operation in these environments can be time-consuming, disruptive to the environments, and may potentially introduce errors if not performed properly.

Accordingly, there is an exemplary need in the art to rectify conflicts that may arise when code resources are updated, and to address related problems that arise in analogous environments.

SUMMARY

According to one exemplary implementation, a method is described for revising code. The method includes: (a) providing a first code module containing a resource; (b) transferring the resource from the first code module to a second code module; (c) providing forwarding information in a new version of the first code module that points to the second code module; and (d) accessing the resource in the second code module via the forwarding information in the first code module.

According to another exemplary implementation, an apparatus is described for compiling code. The apparatus includes a language compiler configured to accept at least a first code module and a second code module, wherein the first code module includes forwarding information that points to a resource in the second code module. The language compiler includes logic configured to generate metadata that expresses a link between the first code module and the second code module based on the forwarding information in the first code module.

BRIEF DESCRIPTION OF THE DRAWINGS

FIG. 11 shows an exemplary computing environment for implementing aspects of the architecture shown in FIG. 3.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

To facilitate explanation, the resource forwarding strategy described herein will be explained primarily in the context of the virtual machine environment illustrated in FIG. 1, and, more specifically, Microsoft's .NET environment. However, the strategy is not restricted to this environment. It can be generally used in any environment that involves one code module referencing another, including stand-alone computer environments, network environments, and so forth. Further, the resource forwarding can be used to provide links to other code resources besides types specified by the .NET's Common Type System (CTS).

This disclosure includes the following sections. Section A describes an exemplary system that provides a resource forwarding strategy to properly link code modules. Section B describes exemplary applications of the operations described in Section A. Section C describes an exemplary procedure for carrying out the operations described in Section A. And Section D describes an exemplary computer environment for implementing the resource forwarding strategy.

A. Exemplary System Employing Resource Forwarding

Overview of System

Figure 3:
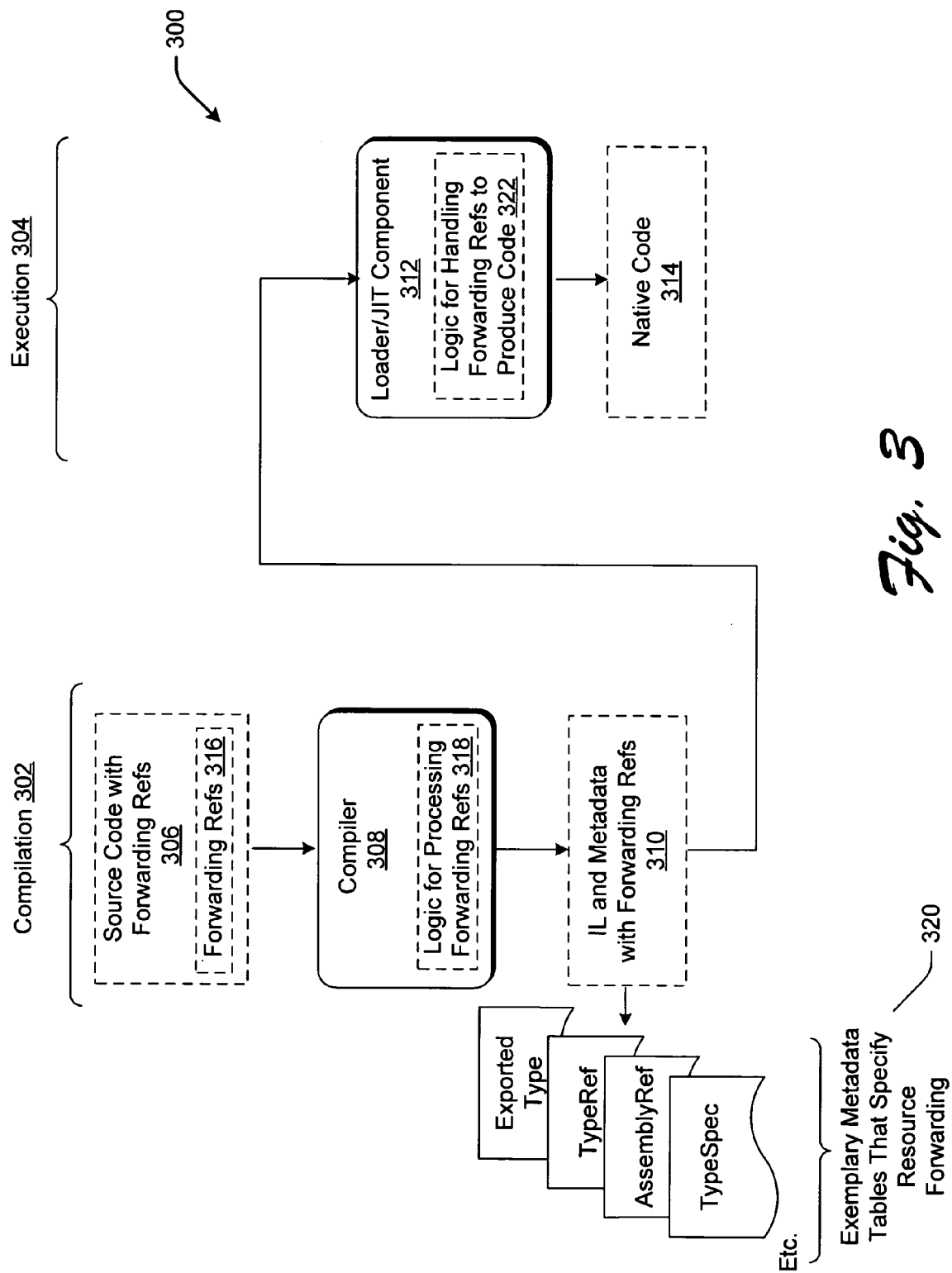
FIG. 3 shows an exemplary architecture that employs resource forwarding to address the problem illustrated in FIG. 2.

FIG. 3 shows an exemplary architecture 300 for building supplier code that implements resource forwarding. This architecture 300 is generally based on the virtual machine architecture 100 shown in FIG. 1, and, in particular, Microsoft's .NET Framework. To repeat, this architecture 300 involves a series of actions 302 for generating intermediate code and metadata, and another series of actions 304 for executing this intermediate code and metadata at runtime. In operation, source code 306 such as C#, C++ with Managed Extensions, Visual Basic.NET, etc.) is fed to a compiler 308 to produce intermediate language (IL) and metadata 310. This IL and metadata 310 references a number of resources expressed in the Common Type System (CTS). At runtime, the CLR loader and just-in-time (JIT) compiler (i.e., the "loader/JIT" component) 312 converts the IL and metadata 310 into native code 314. The native code 314 is in a form that is tailored for execution on a specific machine/software platform.

In the following discussion, code modules will also be referred to as "assemblies." An assembly refers to a collection of one or more files that are versioned and deployed as a unit. An assembly is the primary building block of a .NET Framework application. All resources contained within an assembly are marked either as accessible only within the assembly or as accessible from code in other assemblies. In the above discussion, the source code 306 input into the compiler 308 can be implemented as an assembly derived from one or more source code files.

Figure 1:
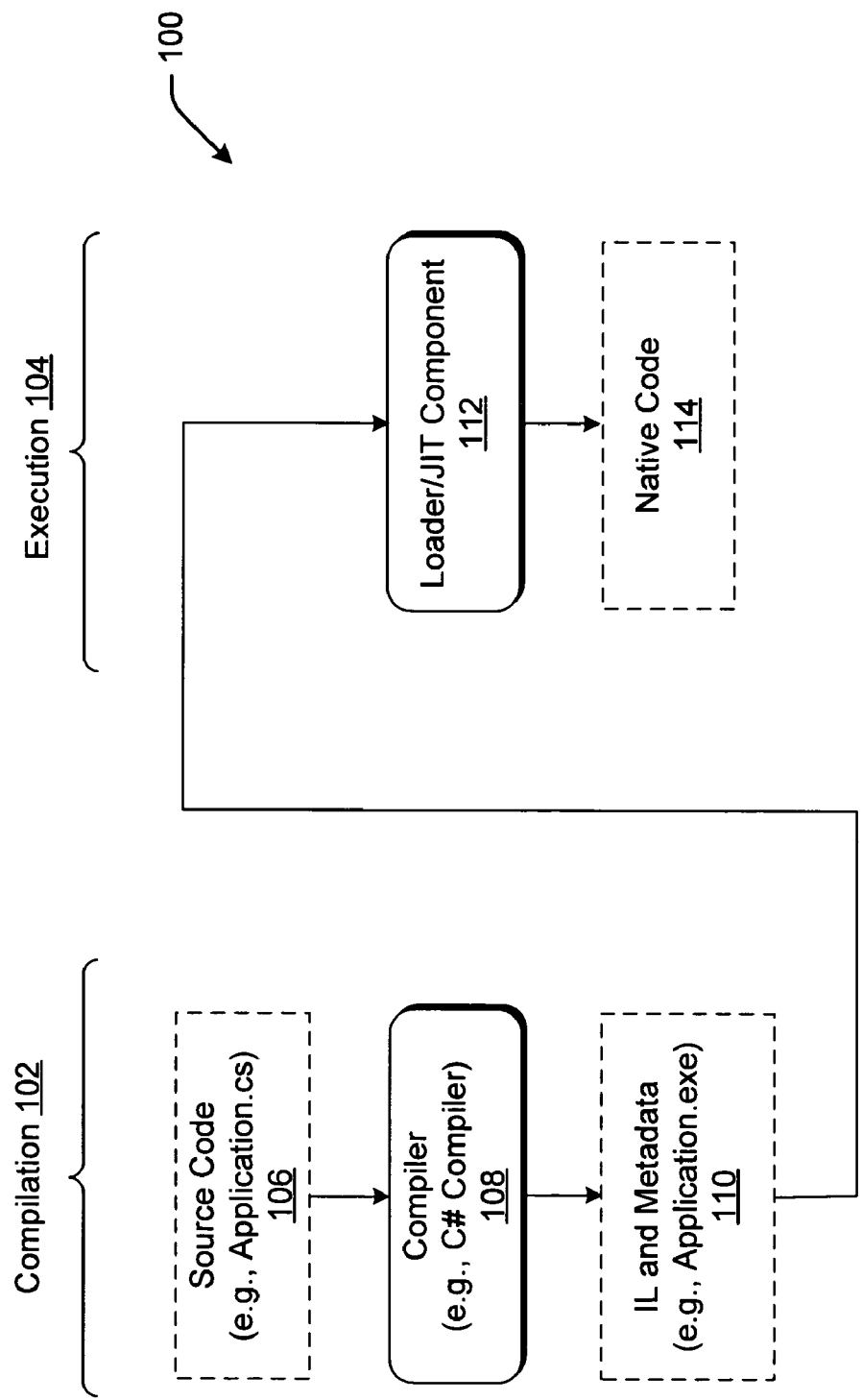
FIG. 1 shows an exemplary architecture that describes the operation of certain aspects of the .NET Framework.

The architecture 300 shown in FIG. 3, unlike the architecture 100 show in FIG. 1, makes use of resource forwarding. Generally, resource forwarding involves providing a reference from one code module to another code module. For example, suppose that a program Appln.exe utilizes a code resource, namely a class Aa.Bb.Cc that was previously provided in a LibraryOld.dll assembly (comprising one or more related files). In the case that the LibraryOld.dll assembly no longer contains this class, resource forwarding can provide a pointer (e.g., "forwarder") in the LibraryOld.dll assembly to point to the location that does actually store the class Aa.Bb.Cc. This forwarder thus serves to redirect Appln.exe from the LibraryOld.dll assembly to another assembly, such as a LibraryNew.dll assembly.

The ForwardTypeAttribute

FIG. 3 shows the application of the resource forwarding strategy to the architecture 300 by first indicating that the source code 306 includes forwarding instructions 316 that affect the forwarding operation. For instance, suppose that the original code for LibraryOld.dll contained the following conventional instructions.

```
// File: LibraryOld.cs
// Version: 1.0
namespace Aa.Bb {
    public class Cc {
        // definition of fields, methods, properties, events, etc.
    }
}
```

This assembly identifies a CTS-conformant class "Cc" having a namespace "Aa.Bb." This assembly also specifies the definition of the class. The class may include a collection of one or more fields, one or more methods, one or more properties, one or more events, etc. (The suffix extension "cs" indicates that this assembly file is written in C#; however, other .NET-compatible languages can be used, such as C++ with Managed Extensions. Visual Basic.NET, and so on.).

The architecture 300 modifies the above conventional assembly file in the following manner to incorporate resource forwarding:

```
// File: LibraryOld.cs
// Version: 2.0
    [assembly:ForwardTypeAttribute(OldName = "Aa.Bb.Cc",
                    NewName = "Ee.Ff.Gg.Hh",
                    NewAssembly = "LibraryNew")]
    namespace Aa.Bb {
        // Remove the definition of class Cc entirely
    }
```

This assembly file inserts a "ForwardTypeAttribute" attribute (which constitutes the forwarding information 316 shown in FIG. 3). Attributes generally control various aspects of the behavior of the code when it is executed. In the instant case, the ForwardTypeAttribute attribute includes parameters "OldName," "NewName," and "NewAssembly." The parameter "OldName" refers to the previous name assigned to the referenced type, in this case "Aa.Bb.Cc." The parameter "NewName" refers to a new name that may be assigned to the referenced type, such as "Ee.Ff.Gg.Hh." The parameter "NewAssembly" refers to the assembly where the referenced type is now located. In general, the NewAssembly parameter can accept a full assembly display name (e.g., "LibraryNew, Version=2.0.0.0, Culture=neutral, PublicKeyToken=b03f5f7f11d50a3a"). Finally, in the above-listed source file, note that the definition of class Cc has been removed from LibraryOld.cs; this is because its contents are now to be found in LibraryNew.cs. The above syntax is merely exemplary; other formats can be used to convey the same instructions.

By virtue of the above-described parameters, the ForwardTypeAttribute attribute can redirect the Appln.exe program from the LibraryOld.dll assembly to the LibraryNew.dll assembly in order to provide the class resource Aa.Bb.Cc. In addition, this attribute can rename the class resource Aa.Bb.Cc, such as, in the example above, to "Ee.Ff.Gg.Hh." In this case, both the name of the class (i.e., Cc) has been changed, as well as its namespace (i.e., Aa.Bb). If the "NewName" attribute is not specified, then the architecture 300 will not rename the resource. If the "NewAssembly" resource is omitted, then the architecture 300 will simply rename the referenced class (without looking to another assembly).

To cope with common usage patterns, constructors can be defined for the ForwardTypeAttribute attribute, accepting OldName and NewAssembly as arguments. An object constructor specifies rules for creating objects, such as rules for specifying initial parameters within objects.

For completeness, an exemplary source file used to build the LibraryNew.dll assembly is as follows:

```
// File: LibraryNew.cs
// Version: 2.0
namespace Ee.Ff.Gg {
    public class Hh {
        // definition of fields, methods, properties, events,
        etc.
    }
}
```

In the case of renaming, this file specifies the referenced class type as Ee.Ff.Gg.Hh (which was renamed from its original namespace/name of Aa.Bb.Cc). This file also includes the definition of the referenced class, which may include various fields, methods, properties, events, etc.

Continuing with the flow of operations illustrated in FIG. 3, the compiler 308 can include logic 318 specifically dedicated to processing the forwarding information 316 within the source code 306 (e.g., as specified by the ForwardTypeAttribute attributes within the source code). In one example, the ForwardTypeAttribute attribute invokes a procedure used to produce metadata that specifies the proper linking between assemblies. The ForwardTypeAttribute attribute is defined in the following exemplary code:

```
namespace System.Runtime.CompilerServices {
    using System;
    [Serializable, AttributeUsage(AttributeTargets.Assembly,
    AllowMultiple=true, Inherited = false)]
    sealed public class ForwardTypeAttribute : Attribute {
        private string _oldName;
        private string _newName;
        private string _newAssembly;
        public ForwardTypeAttribute(string oldName, string
        newAssembly) {
            _oldName = oldName;
            _newAssembly = newAssembly;
        }
        public ForwardTypeAttribute( ) { }
        public string OldName { get { return _oldName; } }
        public string NewAssembly { get { return _newAssembly; } }
    }
}
```

In the above code, the OldName property holds the full name of the type being forwarded, including its namespace. The NewAssembly property holds the display-name of the assembly where the type is being forwarded to (for example: "ConMan, Version=7.0.5000.0, Culture=neutral, PublicKeyToken=b03f5f7f11d50a3a"). The NewName property holds the new full name for the type that is forwarded, including its new namespace.

Metadata Containing Forwarding Information

Application of the logic 318 to the ForwardTypeAttribute attributes in the source code 306 produces metadata that contains the appropriate linking information between assemblies. More specifically, the logic 318 of the compiler 308 produces a series of metadata tables that provide information that affects the necessary linking between assemblies. For instance, the compiler 308 produces an entry in an ExportedType table as specified in the following:

TABLE 1

ExportedType Table (0x27) in LibraryOld.dll

| Column | Meaning | Value |
|---|---|---|
| Flags | 32-bit flags | 0x00200000 |
| TypeDefId | "foreign" TypeDef token: hint of where this Type is defined in another module | 0x(02)005678 |
| TypeName | Name | "Cc" |
| TypeNamespace | Name, up to last "." | "Aa.Bb" |
| Implementation | Where to find this Type's definition. A coded index into File table, ExportedType table, TypeRef, AssemblyRef, or TypeSpec table. | 0x(01)001234 |

In the above table, the flag information has been modified to identify an entry as a forwarder (e.g., as an entry which is invoking the resource forwarding feature described above). This can be achieved by adding a new bit (e.g., "tdForwarder") with a specified value (e.g., 0x00200000) to indicate that this entry is a forwarder.

The implementation column holds a coded index that points to a row number 0x1234 in a TypeRef table (which is also part of the metadata produced by the compiler 308). The following table identifies exemplary contents of the TypeRef metadata:

TABLE 2

TypeRef Table (0x01) in LibraryOld.dll

| Column | Meaning | Value |
|---|---|---|
| ResolutionScope | Index into Module, ModuleRef, AssemblyRef or TypeRef table | 0x(23)0000AB |
| Name | Name | "Hh" |
| Namespace | Name, up to last "." | "Ee.Ff.Gg" |

The Namespace and Name columns specify the name of the moved type—in this case, "Ee.Ff.Gg.Hh."

The value in the ResolutionScope column denotes an index into an AssemblyRef table (which is also part of the metadata produced by the compiler 308). Table 3 provides exemplary contents of an AssemblyRef Table:

TABLE 3

AssemblyRef Table (0x23) in LibraryOld.Dll

| Column | Meaning | Value |
|---|---|---|
| Version | Major.Minor.Build.Revision (16 bits each) | |
| Flags | 32-bit flags | |
| PublicKeyOrToken | Index into Blob heap | |
| Name | Index into String heap | "LibraryNew" |
| Culture | Index into String heap | |
| HashValue | Index into Blob heap | |

The information provided in this table that is directly relevant to the resource forwarding feature is provided in the "Name" column. This column specifies the name of the target assembly.

Thus, to recap, the linked metadata identified in the above series of three tables indicates how to connect a type (such as class Aa.Bb.Cc) specified in an old assembly such as LibraryOld.dll) to a potentially renamed type (such as class Ee.Ff.Gf.Hh) in a new assembly (such as LibraryNew.dll). This functionality is achieved, in part, by modifying the schema of the ExportedType table so that the coded index in its Implementation column can index a row in the TypeRef table, the AssemblyRef table or a TypeSpec table (not shown). (Note that the TypeSpec table generally indexes the specification of a type.)

In the example above, the ExportedType table makes reference to a location in the TypeRef table in order to forward the type Aa.Bb.Cc in assembly LibraryOld.dll to type Ee.Ff.Gg.Hh in assembly LibraryNew.dll. For cases where no renaming is involved, the ExportedType table can make reference to the AssemblyRef table (instead of the TypeRef table). For cases where the target type is a generic instantiated type, or a part-instantiated type, the ExportedType table can make reference to a TypeSpec table (rather than a TypeRef table). Generic types describe generalized features that can be customized to suit different applications. Consider the example in which the original type is specified as "A.B.C." In this case, the forwarded-to type might have the format "X.Y.Z<object>." Consider the example in which the original type is specified as "A.B.C<T>." In this case, the forwarded-to type can have the format of "X.Y.Z<T, int>."

FIG. 3 shows the production of a collection metadata tables 320 to illustrate the above-discussed concepts.

Metadata API

The NET Framework also provides so-called metadata API used to perform various function in the compilation and execution of managed code. Exemplary methods involved are listed below:

DefineExportedType (szName, tkImplementation, tkTypeDef, dwFlags, *pmct)
SetExportedTypeProps(ct, tkImplementation, tkTypeDef, dwExportedTypeFlags)
GetExportedTypeProps(mdct, szName, cchName, *pchName, *ptkImplementation, *ptkTypeDef, *pdwExportedTypeFlags)
EnumExportedTypes(*phEnum, rExportedTypes[ ], cMax, *pcTokens)
FindExportedTypeByName(szName, tkEnclosingType, *ptkExportedType)

CLR Loading and JIT Compilation

Continuing with the flow of operations shown in FIG. 3, after the IL and metadata 310 have been generated by the source code compiler 308, the loader/JIT component 312 comes into play by loading this intermediate code and metadata 310 and converting it into platform-specific native code 314. This operation can be performed just prior to executing the code—hence the name "just-in-time" compilation. Generally, the metadata produced by the compiler 308 will provide the necessary linking between assemblies and between objects within individual assemblies. The format of the metadata, however, will closely conform to the format of any metadata produced by conventional compilers that do not support resource forwarding (e.g., which only allow for linking of objects within individual assemblies). Hence, the loader/JIT component 312 may be able to process the intermediate code and metadata 310 with targeted modification to its conventional approach. This modification can be implemented by the generically labeled logic 322 shown in FIG. 3. For instance, the logic 322 can provide functionality to handle forwarders, including multiple chained forwarders.

The loader/JIT component 312 generates the native code 314 by following the chain of forwarding references provided by the above-described resource forwarding to the end of the chain. That is, assume that a resource is defined via the following chained series of assemblies: assembly W to assembly X; assembly X to assembly Y; and assembly Y to assembly Z. In this case, the loader/JIT component 312 produces the native code 314 by following the above-identified chain.

Additional miscellaneous considerations are addressed in the remaining portions of this section.

Visibility/Accessibility Considerations

Changing the location of a type from one module to another may require a supplier to consider the effects that this revision will produce on the visibility and accessibility of the type. Generally speaking, visibility and accessibility are parameters that define the kinds of actions that can be performed on types and objects. For instance, a type with a "public" visibility status can be accessed by any entity that needs it; a type that has an "assembly" status can only be accessed by an entity that belongs to the same assembly as the type (this is referred to as "NotPublic" status in the CLR and "private" status in C#). In one exemplary implementation, in making use of resource forwarding, a supplier should obey the rules for backwards compatibility. That is, the supplier should not reduce the visibility of a type from public to non-public when making a revision involving the use of resource forwarding. Nor should the supplier reduce the accessibility of a member in the course of forwarding that member (e.g., by changing a method with family accessibility to a method with only assembly accessibility).

For example, consider the example where a supplier moves a public class Aa.Bb.Cc from assembly LibraryOld.dll to LibraryNew.dll, maintaining its public visibility. Further suppose that one of the class's methods, e.g., method "m," possesses assembly-level accessibility (e.g., what C# refers to as "internal" accessibility). In this case, the code in LibraryOld.dll that previously was able to access Aa.Bb.Cc.m by virtue of the fact that it was in the same assembly, can no longer access this class's method (because it is no longer in the same assembly).

There are various ways to address this issue. For instance, the supplier might move those types that access method m into the LibraryNew.dll as well. Or the supplier might widen the accessibility of method m to public status. Or the supplier might make assembly LibraryOld.dll declare assembly LibraryNew.dll to be a so-called CLR-Friend. In any event, the compilation process will signal any problems in compatibility pertaining to visibility and/or accessibility, giving a developer a chance to address these problems in one of the ways described above, or in some other manner.

Reflection and ReflectionEmit

Reflection and ReflectionEmit are features in the .NET Framework that allow a programmer to interact with metadata provided by the compiler 308. Generally, the resource forwarding described above is designed to revise assemblies without "breaking" existing applications. As such, in one exemplary implementation, functionality is provided for ensuring that he Reflection and ReflectionEmit operations work the same regardless of whether the assemblies contain forwarding or not. That is, this functionality should conceal from callers the fact that forwarders are being employed.

For example, the methods Assembly.GetTypes and Assembly.GetExportedTypes are designed to retrieve information from assemblies using the Reflection interface. When applied without modification to an assembly containing resource forwarding, these methods will provide the actual types found in that scope, not including anything forwarded to another scope. However, these methods can be configured to also provide the forwarded type. This modification requires that Reflection conceal the use of resource forwarding from the user (so that the user is not aware that resource forwarding is being performed). (On the other hand, *.GetType( ) methods will provide the forwarded type without modification.)

Various methods can be devised to provide the above-identified functionality. For example, an Assembly.GetForwardedTypes method can be provided that returns the type of all the forwarded types in a specified assembly. A Type.IsForwarder method can be provided that returns a "true" value if the identified type is being forwarded. A Type.Follow method can be provided that takes one step along a chain of forwarders, returning a type object.

Debugging

The use of resource forwarding may require modification to the debugging strategies typically applied in the .NET Framework environment. In one case, the CLR can be employed to debug APIs. Additional debuggers can be layered on top of the CLR analysis (such as Visual Studio Debugger) to provide literal information regarding perceived bugs in the IL and metadata. If these debuggers were created for the case of non-forwarding assemblies, then they may falsely indicate that instances of forwarded types represent error conditions. The analyst can take this into account when reviewing the output of such debuggers. In other implementations, a developer can specifically modify the metadata and/or the debuggers such that the debuggers do not falsely classify instances of resource forwarding as error conditions.

B. Exemplary Applications of Resource Forwarding

Overview of Operation

Figure 2:
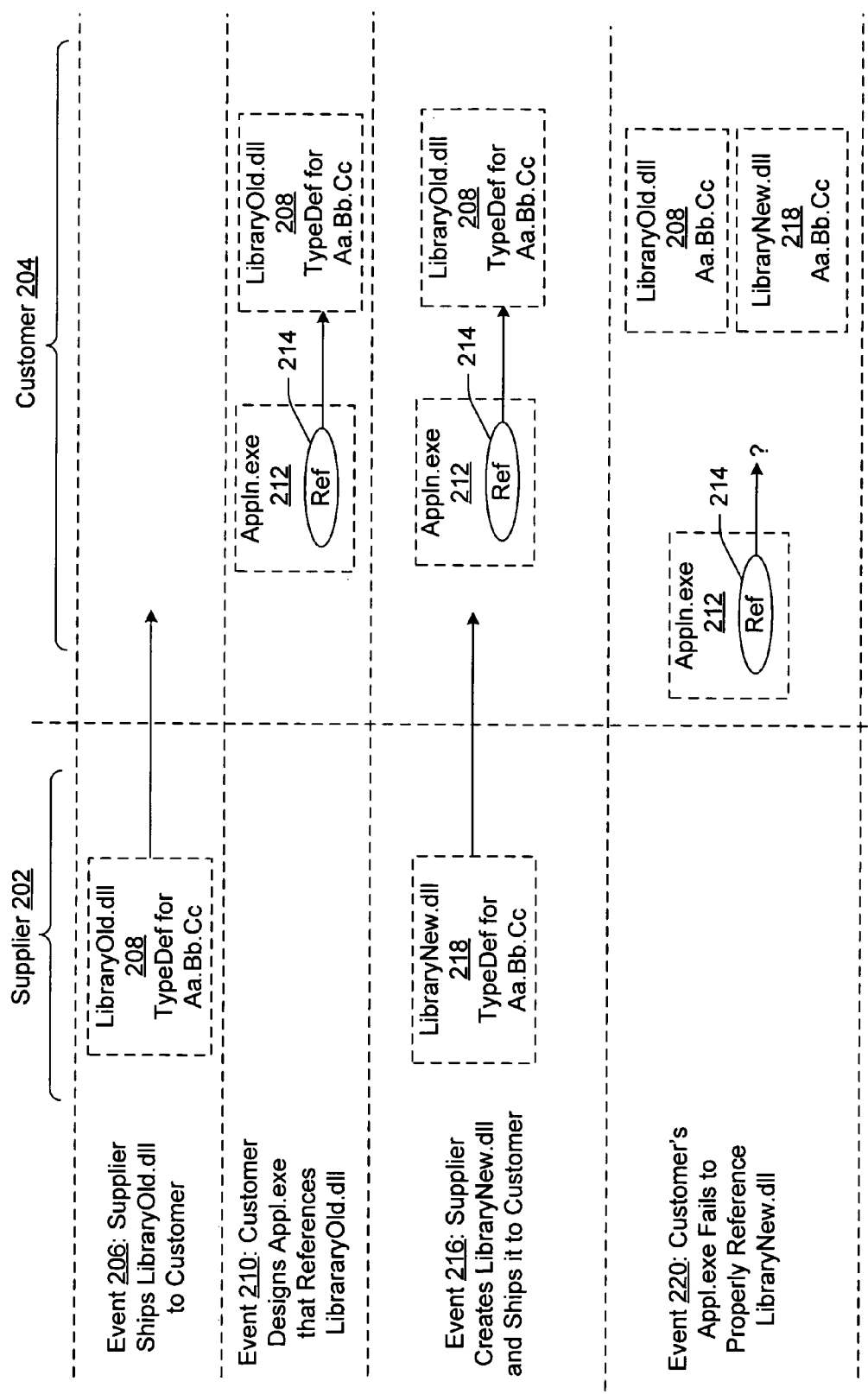
FIG. 2 illustrates a scenario in which a code module is added, causing problems for other code modules that are supposed to interact with the added code module.
Figure 4:
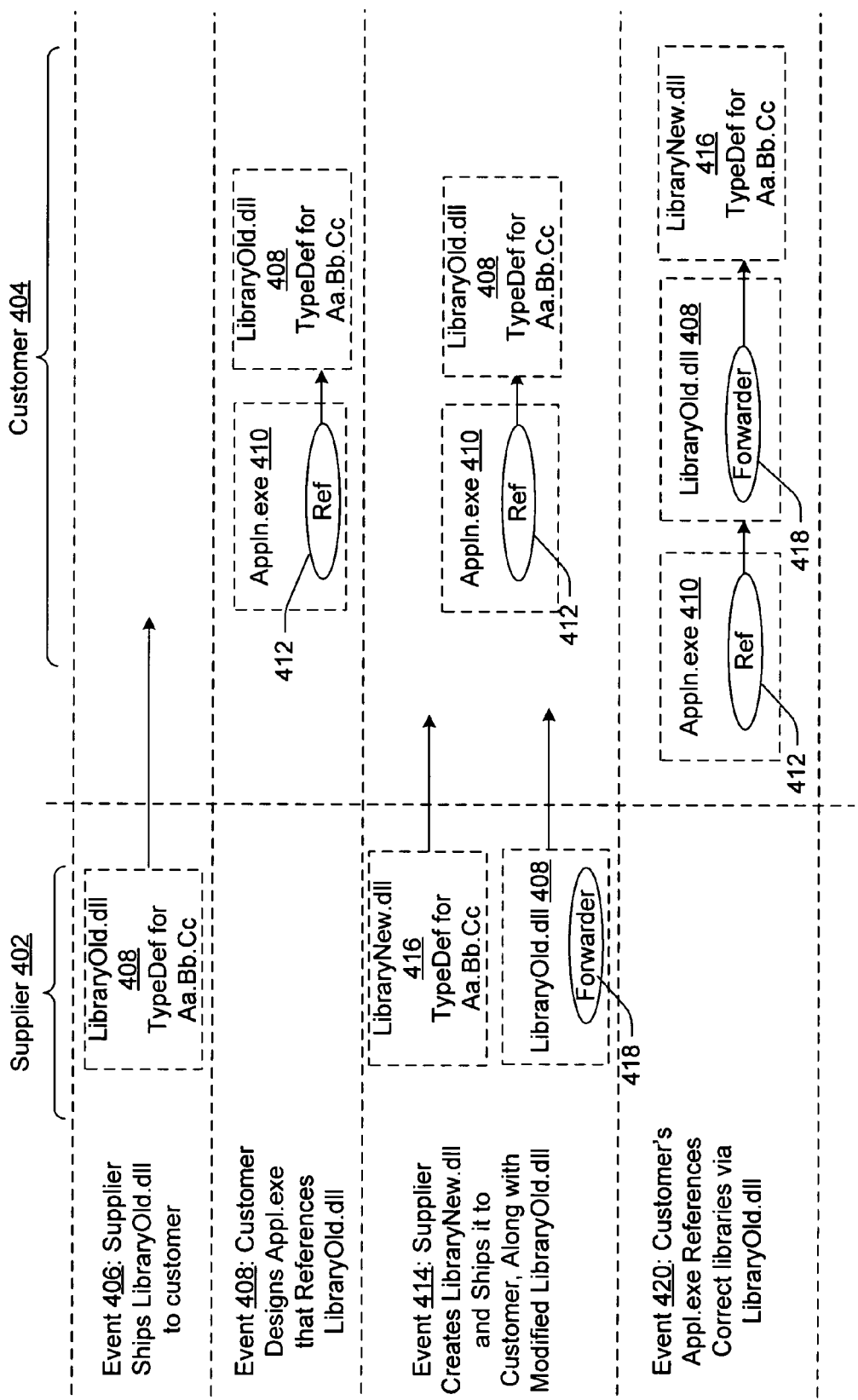
FIG. 4 shows a scenario in which resource forwarding is applied to resolve the problem illustrated in FIG. 2.

FIG. 4 complements FIG. 2 by showing how resource forwarding can be used to solve the problem identified in FIG. 2. This scenario divides the actors into supplier 402 and customer 404. However, the actions shown in FIG. 4 can be performed by any two actors, or only one actor. For instance, a single entity can use the resource forwarding feature to better manage the code modules that it produces and internally uses.

In event 406, the supplier ships an assembly LibraryOld.dll 408 defining a class type Aa.Bb.Cc to the customer. The supplier can use the following command-line script to build LibraryOld.dll:

csc/target:library LibraryOld.cs

In event 408, the customer builds an application Appln.exe 410 that utilizes the type Aa.Bb.Cc in LibraryOld.dll 408. The reference 412 links Appln.exe 410 to LibraryOld.dll 408.

In event 414, the supplier creates a new assembly, LibraryNew.dll 416, which will now define the class type Aa.Bb.Cc instead of LibraryOld.dll. The supplier also modifies LibraryOld.dll 408 so that it includes a forwarder 418 that will point to LibraryNew.dll 416. LibraryOld.dll 408 will also be modified so that it omits the definition of class Aa.Bb.Cc. LibraryNew.dll 416 and modified LibraryOld 408 are shipped to the customer as compiled code modules.

In event 420, the customer's Appln.exe 410 uses the forwarder 418 to link Appln.exe 410 to LibraryNew.dll 416 via LibraryOld.dll 408. That is, Appln.exe 410 accesses LibraryOld.dll 408 in a normal fashion as if this module contained the sought after resources; but, by virtue of the above-described resource forwarding, Appln.exe 410 is directed to LibraryNew.dll 416. Thus, after receiving the updated/new modules from the supplier (i.e., LibraryOld.dll 408 and LibraryNew.dll 416), the customer can continue to interact with Appln.exe 410 as if nothing had changed (e.g., without requiring any recompiling or modification of Appln.exe 410 on the part of the customer). Recall, by contrast, that in the scenario shown in FIG. 2, the customer would have been required to modify Appln.exe 212 in order for it to interact with LibraryNew 218.)

Resource forwarding need not conform to the chronology of events shown in FIG. 4. For instance, suppose that Appln.exe 410 was originally built to interact with LibraryOld.dll 408, but now the supplier wants Appln.exe 410 to interact with another module that is currently available to the customer, such as LibraryOld2.dll (not shown). That is, the customer already has LibraryOld2.dll, but this module is not being used by Appln.exe 410. In this case, the supplier can ship the customer a new LibraryOld.dll that contains the necessary forwarding information (e.g., that links Appln.exe 410 with LibraryOld2.dll via LibraryOld.dll 408).

In one example, LibraryOld.dll 408 can be modified by the supplier so that it is emptied of all of its type definition contents, including class type Aa.Bb.Cc. In this case, LibraryOld.dll 408 is left virtually as an empty shell whose sole purpose is to direct Appln.exe 410 to LibraryNew.dll 416. In another case, the supplier only removes some of the type definitions from LibraryOld.dll 408, such as just class type Aa.Bb.Cc. In this case, Appln.exe 410 can continue to reference LibraryOld.dll 408 for other types besides Aa.Bb.Cc.

As will be appreciated from the above discussion, the use of type forwarders thus has the potential of gracefully allowing the customer's assemblies to evolve without manually attempting to change the couplings between assemblies upon each revision. This thus has the potential of providing a quicker, less burdensome, and more error-free technique for managing a library of assemblies.

The Case of Breaking a Library into Smaller Parts

Figure 5:
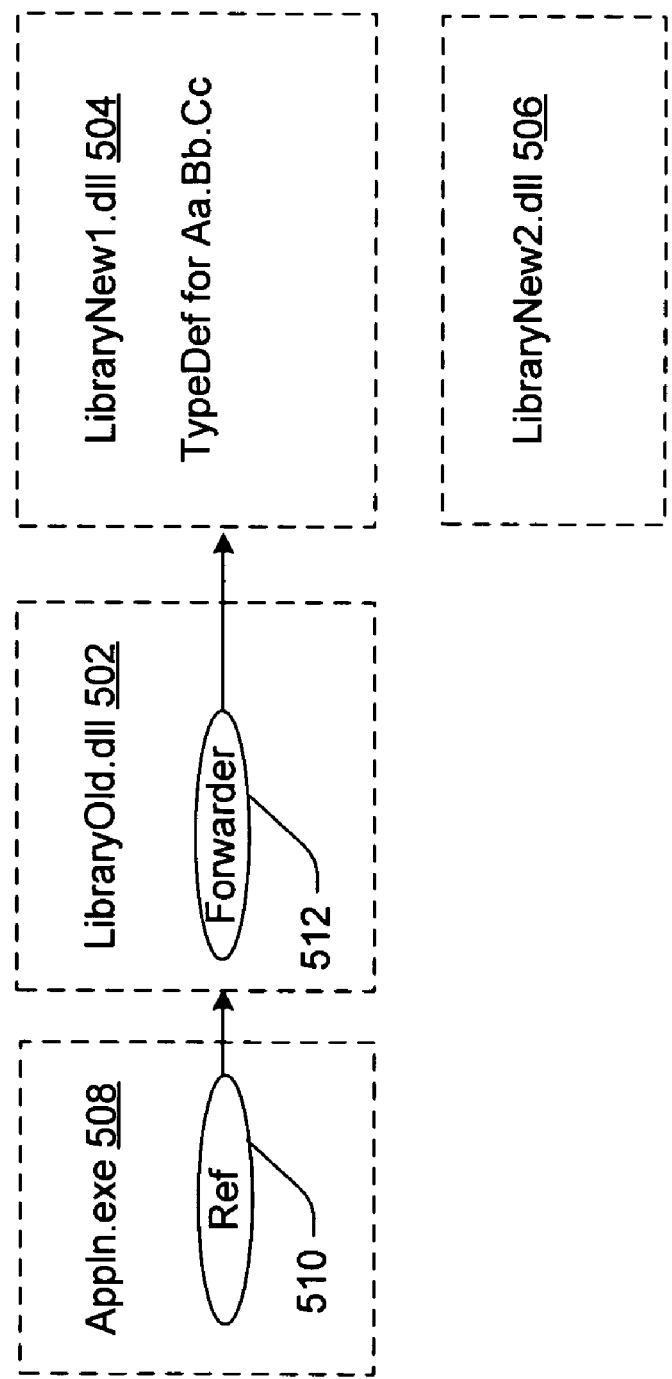
FIGS. 5-9 respectively show four exemplary scenarios in which resource forwarding can be employed.

FIGS. 5-9 show additional examples of different scenarios in which resource forwarding can be applied. For instance, FIG. 5 shows a common case 500 in which the supplier has broken up an assembly LibraryOld.dll 502 that previously contained the type class Aa.Bb.Cc into two new assemblies, LibraryNew1.dll 504 and LibraryNew2.dll 506. In this exemplary case 500, assume that LibraryNew1.dll 504 now contains the class Aa.Bb.Cc. A supplier might have decided to do this because LibraryOld.dll 502 became too large and unwieldy to use as a single assembly, or based on other motivations. Resource forwarding comes into play here by linking Appln.exe 508 to LibraryNew1.dll 504 via the preexisting referencing information 510 in Appln.exe 508 and a forwarder 512 inserted in LibraryOld.dll 502. It should be noted that LibraryOld.dll 502 as it appears in FIG. 5 reflects the modified version of this module (that includes the forwarder 512), rather than the original version (that did not contain the forwarder 512).

The Case of Renaming

Figure 6:
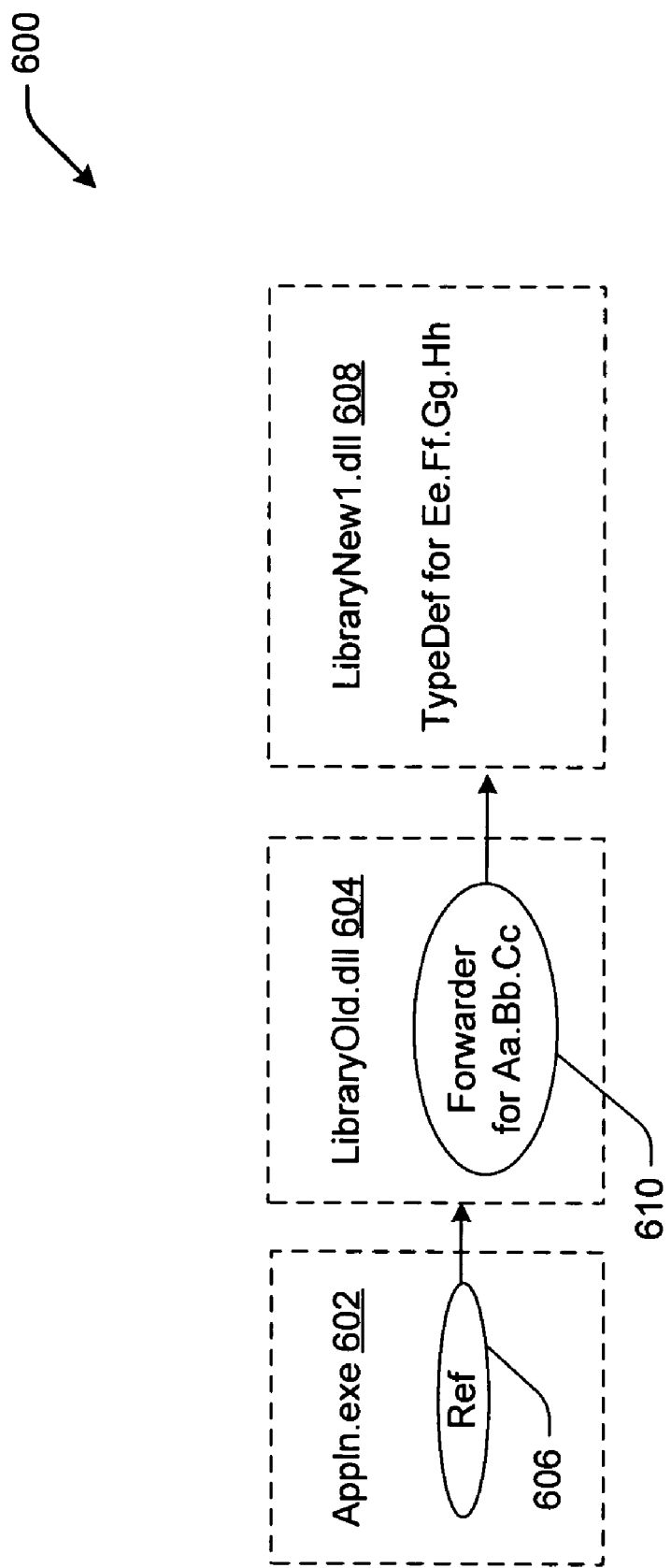

FIG. 6 shows a case 600 that involves renaming of a type (in addition to moving the type from one assembly to another). In this case 600, an application Appln.exe assembly 602 references LibraryOld.dll 604 using referencing information 606. LibraryOld.dll 604 forwards Appln.exe 602 to LibraryNew1.dll 608 via forwarder 610. The forwarder 610 specifies the identity of the new assembly LibraryNew1.dll 608. In addition, the forwarder 610 specifies that the class Aa.Bb.Cc being sought by Appln.exe 602 is now named Ee.Ff.Gg.Hh. This is thus a case were the namespace is updated (to Ee.Ff.Gg) in addition to the name of the class (Hh). The Forwarder 610 can also rename the requested class without directing Appln.exe 602 to another assembly.

Generally, the resource forwarding functionality allows a user to rename types on a type-by-type basis by associating a ForwardTypeAttribute attribute with each type to be renamed (and/or moved) in the source code. Upon compiling, this will result in a corresponding renaming or relocating entry in the ExportedType table. In some cases, users may want to relocate entire namespaces at a time. For example, a user may want to move all the types in namespace Aa.Bb to namespace Aa.Xx. This can be performed using the above-described resource forwarding by requiring the user to attach a ForwardTypeAttribute attribute to every type defined in the identified namespace (i.e., namespace Aa.Bb). In another implementation, the resource forwarding functionality can be modified to allow users to modify the name spaces en bloc. This can be performed by providing a compiler that supports attaching a pseudo-attribute to namespaces, e.g., as exemplified by the following code:

```
namespace Aa {[ForwardTypeAttribute(NewName = "Xx",
NewAssembly = "OverThere")]
    namespace Bb {
    ...}
}
```

In one exemplary implementation, the compiler (or migration tool) would parse this attribute, now qualifying a namespace, and emit the multiple, real, ForwardTypeAttribute attributes for each type in the namespace Aa.Bb.

On the other hand, a user may wish to disable renaming support in some cases. On way of accomplishing this is to assign private status to the NewName property in the ForwardTypeAttribute class.

The Case of Chained Forwarders

Figure 7:
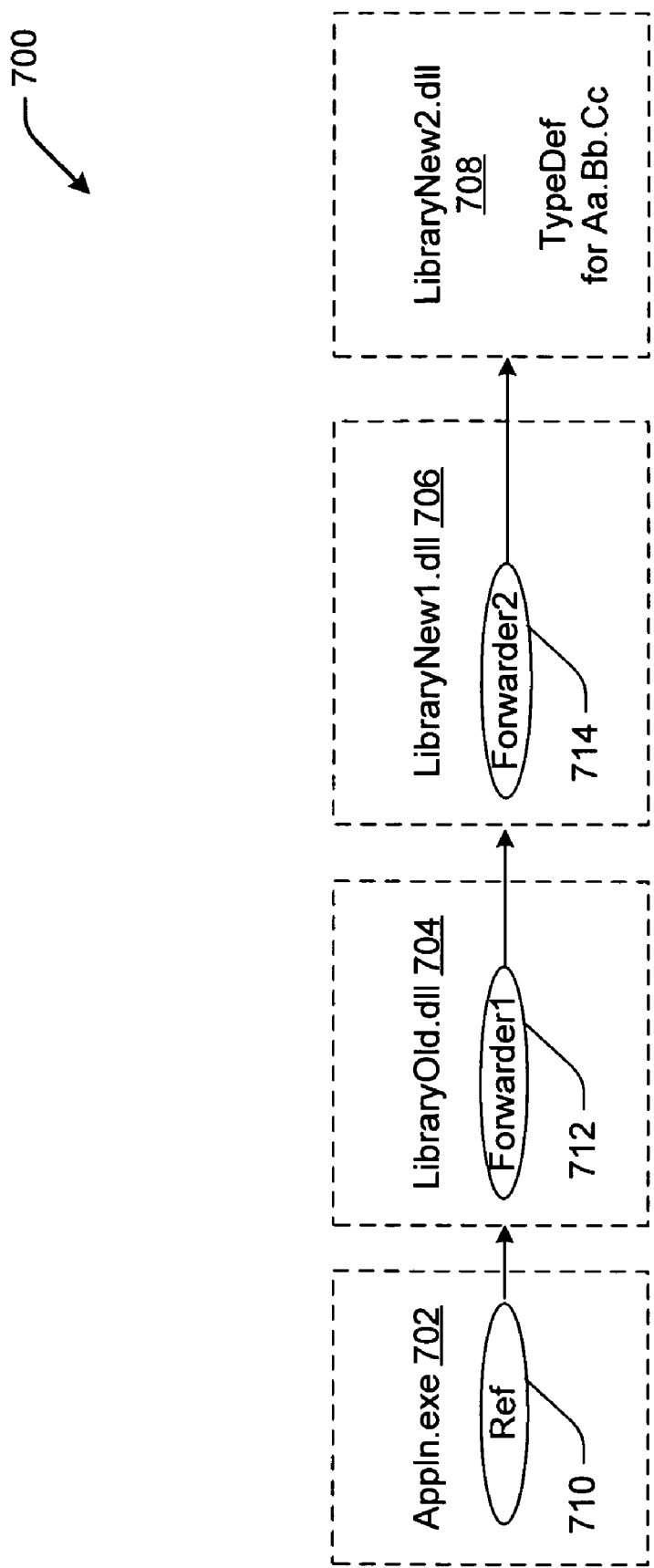

FIG. 7 shows a case 700 that involves the use of multiple forwarders. In this case 700, Appln.exe 702 needs to interact with the class Aa.Bb.Cc. This class was originally present in LibraryOld.dll 704, and then later moved to LibraryNew1.dll 706, and still later moved to LibraryNew2.dll 708. In this scenario, reference information 710 associated with Appln.exe 702 identifies LibraryOld.dll 704 as containing the requested class. Forwarder1 712 in LibraryOld.dll 704 identifies LibraryNew1.dll 706 as containing the requested class. In turn, Forwarder2 714 in LibraryNew1.dll 706 identifies LibraryNew2.dll 708 as containing the requested class. In this manner, a customer's library of assemblies can gracefully evolve to address successive revisions over time. FIG. 7 shows the case where two revisions were made: a first involving the creation of LibraryNew1.dll 706 and the modification of LibraryOld.dll 704 to include forwarder1, and a second involving the creation of LibraryNew2.dll 708 and the modification of LibraryNew1.dll 706 to include forwarder2. Additional chained assemblies and associated forwarders can be used to identify the class. However, the chain of referencing forwarders should not form a loop, as this will produce an error in the compilation process. Looping occurs when an assembly references a prior assembly in the chain, causing the referencing to form a loop with no terminus.

The Case of Multi-Module Assemblies

Figure 8:
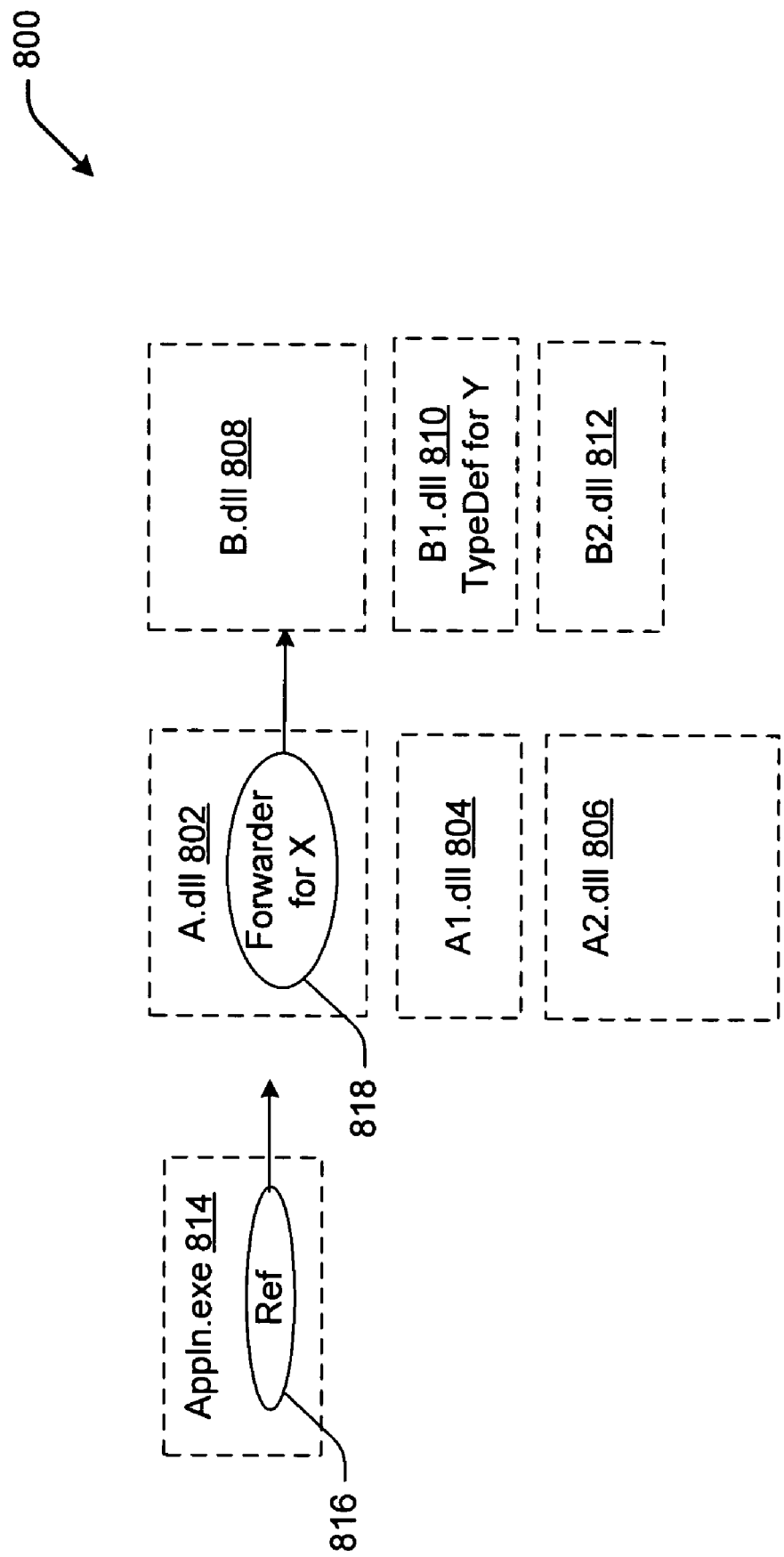

FIG. 8 shows a case 800 where the forwarding and receiving assemblies each include multiple modules, instead of just one (as in the previous examples). Namely, a first "A" assembly includes a main module A.dll 802, and two related modules, A1.dll 804 and A2.dll 806. A second "B" assembly includes a main module B.dll 808, and two related modules B1.dll 810 and B2.dll 812. Presume that Appln.exe 814 seeks to reference a class X that was previously stored in module A2.dll 806, but that is now stored in B1.dll 810, and has been renamed as class Y. To provide the necessary linking, a forwarder 818 in A.dll 802 identifies B.dll 808 as containing the requested class X (now renamed as class Y). (In other words, the TypeDef would be in B1.dll 810, but outside assemblies, such as A.dll 802, point to it, via the assembly B.dll 808 that holds module B1.dll 810. This causes B.dll 808 to be loaded. If X is public, B.dll 808 will have a non-forwarder ExportedType pointing to B1.dll 810; but if X is not public, the type would fail to load when an outside assembly asked for it.) Otherwise, forwarding is applied to the multi-module environment in much the same manner that it is applied in the single-module environment.

More specifically, for simplicity, suppose that the code sources for each module match their name. For example, A1.cs holds the source code for A1.dll. The required changes to the source code to affect this resource forwarding are generally the same as specified above for the single-module assembly case. For instance, the source code for A2.cs can have the following content to produce the desired type forwarding:

```
// File: A2.cs
// Version: 2.0
[assembly:ForwardTypeAttribute(OldName = "X", NewName = "Y", NewAssembly = "B")]
And the source code for B1.cs can have the definition for type Y:
// File: B1.cs
// Version: 2.0
public class Y {
    // definition of fields, methods, properties, events, etc
}
```

Based on these files, the compiler 308 can generate metadata, and, in particular, ExportedType tables, to generate intermediate code having the necessary linking information. That is, the compiler 308 creates an ExportedType table for the main module of the assembly in the manner described above. But in the present case, the operation additionally includes "hoisting" the ForwardTypeAttribute attributes from subsidiary modules as well. In another words, a copy of each of the forwarder ExportedTypes from subsidiary modules is provided in the respective main modules of the assemblies. By virtue of this, the ForwardTypeAttribute attributes are effectively copied to the main modules.

The above-described operations will affect the metadata contents as follows. In the case of the main module (A.dll 802), the ExportedType table will replace the "export" row with a "forwarder" row for type X. In the case of module A2.dll 806, the custom attribute will include the ForwardTypeAttribute attribute, which gets "hoisted" into A.dll 802's ExportedType table. In the case of the module B1.dll 810, the TypeDef parameter will include the definition of class Y. In the case of B1.dll 810, FieldDef, MethodDef, etc. tables are also affected in an appropriate manner.

The Case of Multiple Application Revisions

Figure 9:
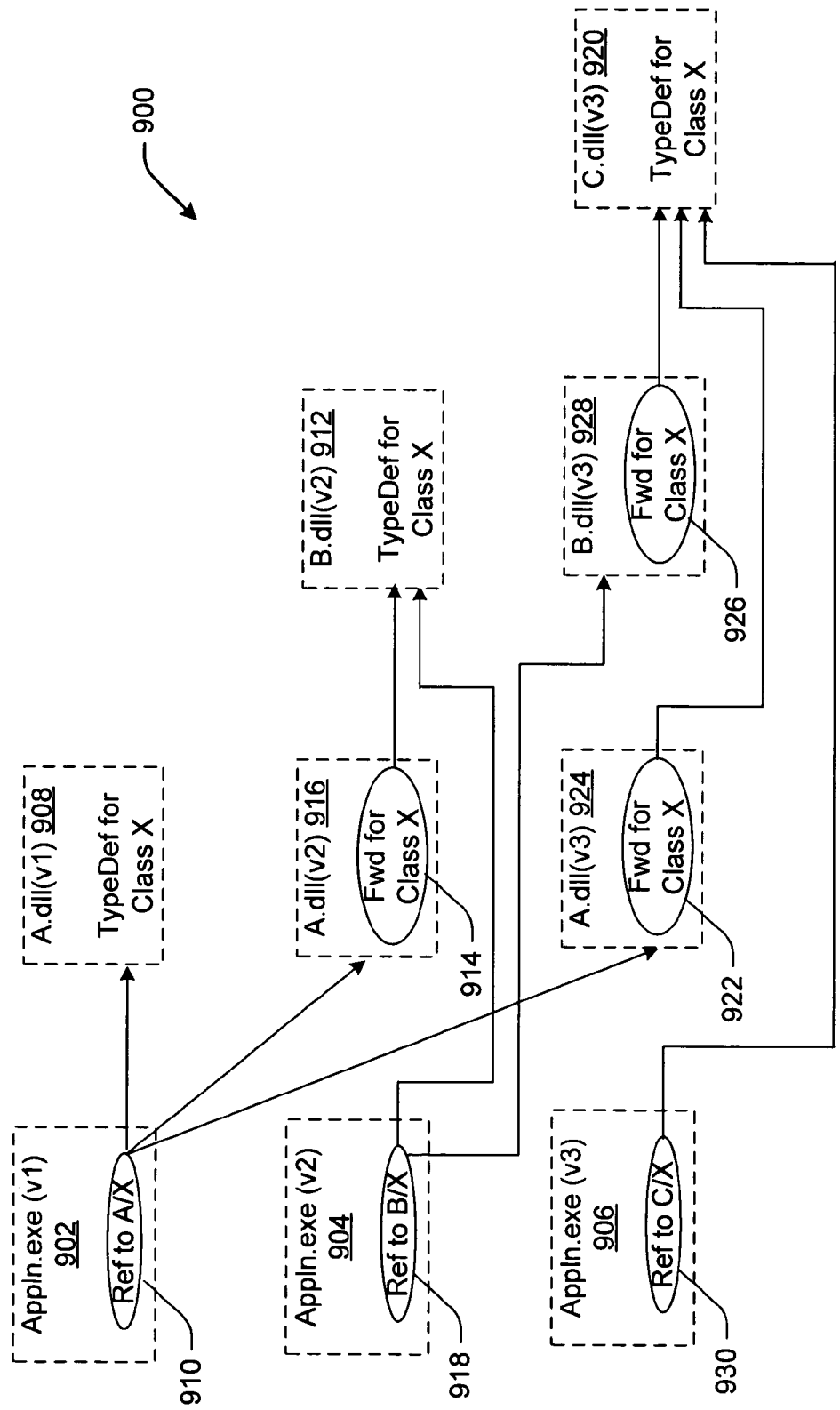

The above examples provided isolated cases involving different respective forwarding scenarios. However, an actual programming environment may involve various combinations of the above-described scenarios to provide a tree of linked assemblies. FIG. 9 illustrated one such case 900 involving the use of a combination of linking techniques. Namely, FIG. 9 shows three versions of Appln.exe developed at different successive times—namely, Appln.exe (v1) 902, Appln.exe (v2) 904, and Appln.exe (v3) 906. Appln.exe (v1) 902 originally referenced assembly A.dll (v1) 908 via referencing information 910 to obtain a needed class X.

In the second version (v2), the supplier decided to move type X into a new assembly, B.dll (v2) 912. This also required modification of the A.dll assembly by adding a forwarder 914 to produce A.dll (v2) 916. Accordingly, the Appln.exe (v1) 902 can successfully interact with both A.dll (v1) 908 and B.dll (v2) 912 (via A.dll v2 916).

Assume, however, that the customer decides to rebuild Appln.exe (v1) 902 to produce the Appln.exe (v2) 904. In this process, the compiler may generate a shortcut which directly couples Appln.exe 904 to the assembly containing the type X it needs, namely B.dll (v2) 912. This shortcut is shown by the line in FIG. 9 that directly couples Appln.exe (v2) 904 with B.dll 912 (using TypeRef referencing information 918). In this case, Appln (v2) 904 will correctly interact with B.dll (v2) 912, (and possibly with A.dll (v2) 916 for access to resources other than Type X).

In the third version (v3), the supplier decides to again move type X into a new assembly, C.dll (v3) 920. In order to maintain Appln.exe (v1) 902, the supplier modifies A.dll by adding a forwarder 922 to class X (contained in C.dll 920) to produce A.dll (v3) 924. In order to maintain Appln.exe (v2) 904, the supplier modifies B.dll by adding a forwarder 926 to class X (contained in C.dll 920) to produce B.dll (v3) 928.

The customer may at some point decide to rebuild Appln.exe (v2) 904 yet again to produce the Appln.exe (v3) 906. In this process, the compiler may generate a shortcut which directly couples Appln.exe (v3) 906 to the assembly now containing the type X it needs, namely C.dll (v3) 920. This shortcut is shown by the line in FIG. 9 that directly couples Appln.exe (v3) 906 with C.dll 920 via referencing information 930.

In the above-indicated revisions, the customer should use a version of the compiler 308 that is specifically adapted to handle the presence of resource forwarders. The use of a compiler that is not so configured will produce an error. For instance, this compiler may indicate that it has failed to compile the Appln.cs file because the compiler detects that an assembly embeds metadata whose schema version is higher than it "understands." Alternatively, this compiler can signal an error by outputting a message such as "Appln.cs: error CS0246: The Type or namespace name "X" could not be found (are you missing a using directive or an assembly reference?)."

As an aside, the customer can also use a Native Image Generator (NGEN) to convert the IL and metadata to native code without using the piecemeal runtime approach. In generating the native code, NGEN can generate shortcuts in a similar manner to that described above.

The Case of Nested Types

Source code can be written such that types are embedded within types in a nested relationship. In this case, the compiler 308 can also emit forwarders for all of the nested types into the ExportedType table. For example, consider the case where a class "Aa.Encloser" encloses a class "Nested." Presume further that the class Aa. Encloser is forwarded from assembly A to assembly B without renaming the classes. An exemplary resultant ExportedType table produced by the compiler 308 in this scenario is as follows:

TABLE 4

ExportedType Table (0x27) in Assembly "A"

| Column | Meaning | Row for Encloser | Row for Nested |
| --- | --- | --- | --- |
| Flags | 32-bit flags | 0x00200000 | 0x00200000 |
| TypeDefId | "foreign" TypeDef token: hint of where this Type is defined in another module | 0x(02)005678 | 0x(02)005679 |
| TypeName | Name | "Encloser" | "Nested" |
| TypeNamespace | Name, up to last "." | "Aa" | "" |
| Implementation | Where to find this Type's definition. A coded index into File table, ExportedType table, TypeRef, AssemblyRef, or TypeSpec table. | 0x(23)001234 | 0x(23)001234 |

In this table, the Flags column for both rows (e.g., one row for "Encloser" and another row for "Nested" class) has the tdForwarder bit set. Also, the namespace for all nested types is left blank. Both rows index the same row (number 0x1234) in the AssemblyRef table. (Also note that this example demonstrates the referencing of an AssemblyRef table in the Implementation column, instead of a TypeRef table, as in the previous example given in Section A. This table can specify the AssemblyRef table because no renaming is involved, so it is possible to "skip" reference to an intermediate TypeRef table.) Exemplary contents of the AssemblyRef table are shown below:

TABLE 5

AssemblyRef Table (0x23) in Assembly "A"

| Column | Meaning | Value |
| --- | --- | --- |
| Version | Major.Minor.Build.Revision (16 bits each) | |
| Flags | 32-bit flags | |
| PublicKeyOrToken | Index into Blob heap | |
| Name | Index into String heap | "B" |
| Culture | Index into String heap | |
| HashValue | Index into Blob heap | |

In this example, all nested types are forwarded to the same assembly as their containing type (that is, the type that "encloses" the nested types). Thus, one ForwardTypeAttribute attribute can be applied to the encloser type to specify the linking information for all of the types embedded within this encloser type. The compiler 308 will interpret this single ForwardTypeAttribute attribute as applying to all embedded types. However, in other implementations, it is possible to direct types to different assemblies within the same encloser type, in which case, each type should receive its own forwarder.

Application to Other Kinds of Resources

Although the above examples described how to forward the definition of a class, the resource forwarding strategy applies to any kind of type defined by the CTS of the .NET Framework, including, but not limited to, interface types, value types, enum types, delegate types, generic types, etc. In another implementation, the resource forwarding can also be extended to provide forwarding of other resources specified within the .NET Framework. Also, as mentioned above, the .NET environment is merely one application of the resource forwarding concept; the principles described here can be broadly applied in any environment in which one code module needs to reference resources in another code module for any reason. Further, application of the forwarding strategy is not restricted to the virtual machine environment.

C. Method of Operation

Overview of Method

Figure 10:
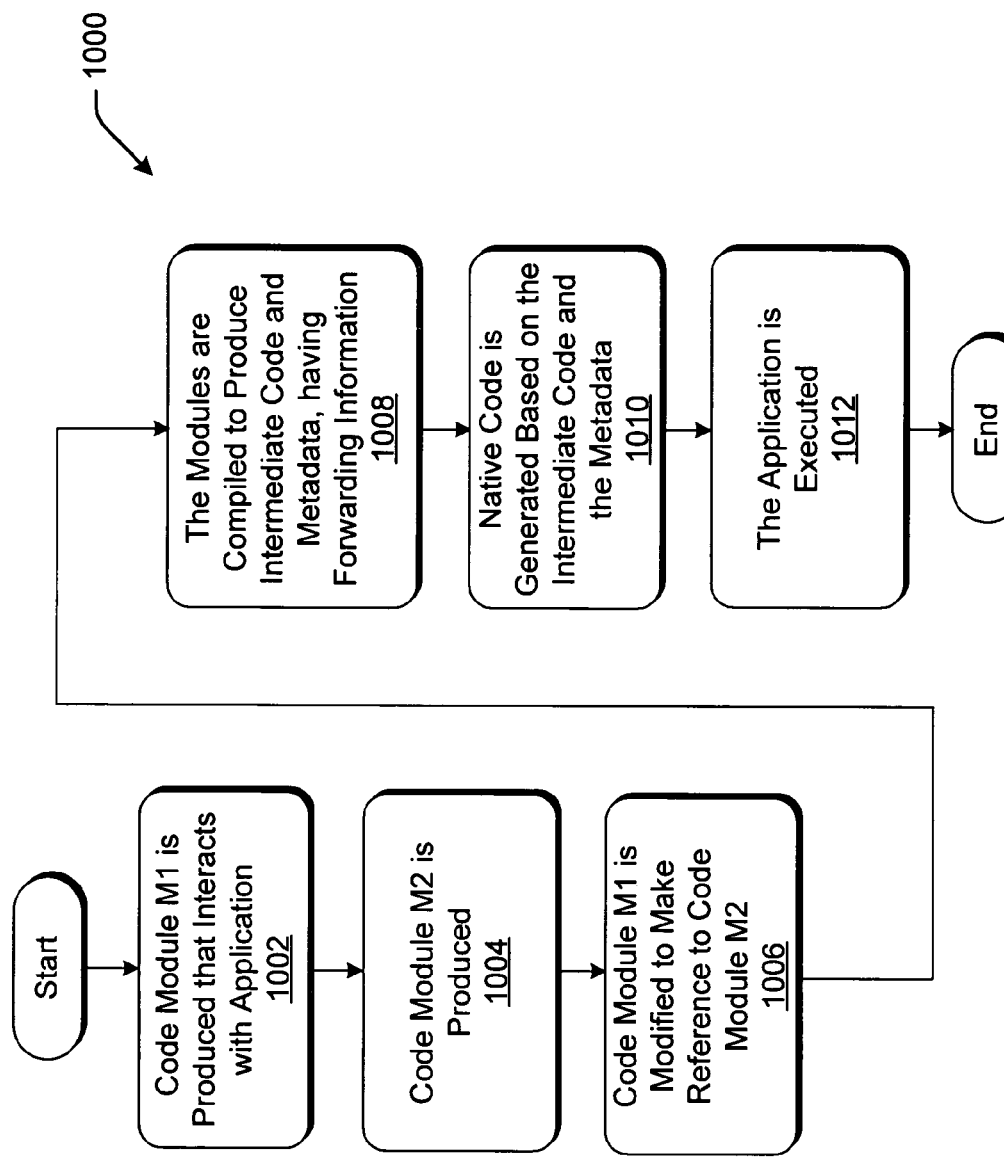
FIG. 10 shows a process used to implement the resource forwarding architecture shown in FIG. 3.

FIG. 10 shows an overview of one general application of the resource forwarding strategy described above. In the process 1000 shown in this figure, step 1002 entails producing a first version of an assembly M1, such as LibraryOld.dll. This assembly M1 may be designed to interact with an already existing application (e.g., Appln.exe), or a customer may later design an application to interact with this assembly.

Step 1004 entails producing another assembly M2, such as LibraryNew.dll. A supplier may generate and supply this second module M2 based on one or more considerations. For instance, the supplier may wish to break up LibraryOld.dll because it has become too large. Or the supplier may wish to remove certain types from LibraryOld.dll (to produce LibraryNew.dll) to leave LibraryOld.dll (and/or LibraryNew.dll) with only one kind of type.

Step 1006 entails modifying the first version of the assembly M1 (LibraryOld.dll) such that it references the assembly M2 LibraryNew.dll. This operation produces a second version of the assembly M1 (LibraryOld.dll). This modification can entail adding a forwarder (e.g., the ForwardTypeAttribute attribute) in the source code of LibraryOld.dll to produce the second version. Upon compiling, this attribute will generate necessary linking data in the metadata.

Step 1008 entails compiling the source code for the assemblies (LibraryOld.dll and LibraryNew.dll) to provide intermediate code and metadata. The forwarders in the source code result in forwarding information specified in the metadata. In particular, the forwarding information can be specified in an ExportedType table, which can make reference to a TypeRef table, an AssemblyRef table, and/or a TypeSpec table.

Step 1010 entails converting the intermediate code and metadata into native code that is adapted to run on a specified computing platform.

And Step 1012 entails running the application using the native code produced in step 1010.

Performance Considerations

The above-described modifications to the metadata structure and loader code do not reduce performance to a significant extent. Consider, for example, the case where resource forwarding is employed to move the definition of class Aa.B-b.Cc from assembly LibraryOld.dll to assembly LibraryNew.dll. This results in no net change in storage requirements. Next, consider the case where a forwarder row is inserted into the ExportedType table, and a row is inserted in the TypeRef table. This incurs the following memory costs:

ExportedType: 20 bytes+size of full type name; and

TypeRef: 12 bytes+size of new full type name (if no rename, then the metadata engine interns to the original string, with no duplicated cost).

These are worst-case scenarios; they assume that the forwarding assembly is large, so that metadata indexes occupy 4 bytes each, rather than 2. There are other costs associated with scoping AssemblyRef, but these are amortized over multiple forwarders, so these are not counted in the per-forwarder cost.

Therefore, for the above example, forwarding Aa.Bb.Cc from assembly LibraryOld.dll to assembly LibraryNew.dll costs about 35 bytes (for "Cc," since it is likely that namespace "Aa.Bb" is referenced many times in the string heap). Renaming to "Ee.Ff.Gg.Hh" incurs a further 3 bytes (for "Hh," again assuming amortizing storage of the "Ee.Ff.Gg" namespace applies).

D. Exemplary Computer Environment

FIG. 11 provides information regarding a computer environment 1100 that can be used to implement any of the processing functions described in the proceeding sections, such as various compilation operations provided by the source code compiler 308 and/or the loader/JIT component 312.

The computing environment 1100 includes the general purpose computer 1102 and the display device 1104 discussed in the context of FIG. 1. However, the computing environment 1100 can include other kinds of computer and network architectures. For example, although not shown, the computer environment 1100 can include hand-held or laptop devices, set top boxes, programmable consumer electronics, mainframe computers, gaming consoles, etc. Further, FIG. 11 shows elements of the computer environment 1100 grouped together to facilitate discussion. However, the computing environment 1100 can employ a distributed processing configuration. In a distributed computing environment, computing resources can be physically dispersed throughout the environment.

Exemplary computer 1102 includes one or more processors or processing units 1106, a system memory 1108, and a bus 1110. The bus 1110 connects various system components together. For instance, the bus 1110 connects the processor 1106 to the system memory 1108. The bus 1110 can be implemented using any kind of bus structure or combination of bus structures, including a memory bus or memory controller, a peripheral bus, an accelerated graphics port, and a processor or local bus using any of a variety of bus architectures. For example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1102 can also include a variety of computer readable media, including a variety of types of volatile and non-volatile media, each of which can be removable or non-removable. For example, system memory 1108 includes computer readable media in the form of volatile memory, such as random access memory (RAM) 1112, and non-volatile memory, such as read only memory (ROM) 1114. ROM 1114 includes an input/output system (BIOS) 1116 that contains the basic routines that help to transfer information between elements within computer 1102, such as during start-up. RAM 1112 typically contains data and/or program modules in a form that can be quickly accessed by processing unit 1106.

Other kinds of computer storage media include a hard disk drive 1118 for reading from and writing to a non-removable, non-volatile magnetic media, a magnetic disk drive 1120 for reading from and writing to a removable, non-volatile magnetic disk 1122 (e.g., a "floppy disk"), and an optical disk drive 1124 for reading from and/or writing to a removable, non-volatile optical disk 1126 such as a CD-ROM, DVD-ROM, or other optical media. The hard disk drive 1118, magnetic disk drive 1120, and optical disk drive 1124 are each connected to the system bus 1110 by one or more data media interfaces 1128. Alternatively, the hard disk drive 1118, magnetic disk drive 1120, and optical disk drive 1124 can be connected to the system bus 1110 by a SCSI interface (not shown), or other coupling mechanism. Although not shown, the computer 1102 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 1102. For instance, the readable media can store the operating system 1130, one or more application programs 1132, the compilation logic shown in FIG. 3, other program modules 1134, and program data 1136.

The computer environment 1100 can include a variety of input devices. For instance, the computer environment 1100 includes the keyboard 1138 and a pointing device 1140 (e.g., a "mouse") for entering commands and information into computer 1102. The computer environment 1100 can include other input devices (not illustrated), such as a microphone, joystick, game pad, satellite dish, serial port, scanner, card reading devices, digital or video camera, etc. Input/output interfaces 1142 couple the input devices to the processing unit 1106. More generally, input devices can be coupled to the computer 1102 through any kind of interface and bus structures, such as a parallel port, serial port, game port, universal serial bus (USB) port, etc.

The computer environment 1100 also includes the display device 1104. A video adapter 1144 couples the display device 1104 to the bus 1110. In addition to the display device 1104, the computer environment 1100 can include other output peripheral devices, such as speakers (not shown), a printer (not shown), etc.

Computer 1102 can operate in a networked environment using logical connections to one or more remote computers, such as a remote computing device 1146. The remote computing device 1146 can comprise any kind of computer equipment, including a general purpose personal computer, portable computer, a server, a router, a network computer, a peer device or other common network node, etc. Remote computing device 1146 can include all of the features discussed above with respect to computer 1102, or some subset thereof.

Any type of network can be used to couple the computer 1102 with remote computing device 1146, such as a local area network (LAN) 1148, or a wide area network (WAN) 1150 (such as the Internet). When implemented in a LAN networking environment, the computer 1102 connects to local network 1148 via a network interface or adapter 1152. When implemented in a WAN networking environment, the computer 11102 can connect to the WAN 1150 via a modem 1154 or other connection strategy. The modem 1154 can be located internal or external to computer 1102, and can be connected to the bus 1110 via serial I/O interfaces 1156 or other appropriate coupling mechanism. Although not illustrated, the computing environment 1100 can provide wireless communication functionality for connecting computer 1102 with remote computing device 1146 (e.g., via modulated radio signals, modulated infrared signals, etc.).

In a networked environment, the computer 1102 can draw from program modules stored in a remote memory storage device 1158. Generally, the depiction of program modules as discrete blocks in FIG. 11 serves only to facilitate discussion; in actuality, the programs modules can be distributed over the computing environment 1100, and this distribution can change in a dynamic fashion as the modules are executed by the processing unit 1106.

Wherever physically stored, one or more memory modules 1108, 1122, 1126, 1158, etc. can be provided to store the compilation operations described in FIG. 3.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for revising code, comprising:
   providing a-first code module containing a resource, wherein the resource includes forwarding instructions;
   generating intermediate code and metadata that reference the resource;
   producing a second code module;
   transferring the resource from the first code module to the second code module;
   providing forwarding information in a new version of the first code module that points to the second code module;
   accessing the resource in the second code module via the forwarding information in the first code module;
   generating intermediate code and metadata having forwarding information, wherein metadata specifies a proper linking between the first code module and the second code module and between objects within the individual code modules; and
   executing metadata at runtime.

2. The method according to claim 1, wherein the first code module and second code module include resources in the form of type definitions that are accessible to an application program.

3. The method according to claim 1, wherein, subsequent to the transferring, the first code module includes no resources.

4. The method according to claim 1, wherein, subsequent to the transferring, the first code module includes remaining resources.

5. The method according to claim 1, wherein the forwarding information contains parameters for specifying a name of the resource and a location of the resource.

6. The method according to claim 1, wherein the forwarding information contains parameters for specifying a previous name of the resource, and a new name of the resource.

7. The method according to claim 1, further comprising repeating the above-referenced resource transferring and providing of the forwarding information one or more times to establish a chain of forwarding information, wherein the resource is accessed through the chain of forwarding information.

8. The method according to claim 1, wherein the accessing comprises compiling the first code module and the second code module to produce metadata that describes how the first code module is coupled to the second code module via the forwarding information, wherein the metadata is used to retrieve the resource from the second code module via the forwarding information.

9. The method according to claim 8, wherein the accessing further comprises generating machine-executable code based on the metadata.

10. A computer readable medium including machine readable instructions for implementing each of the providing a first code module, transferring, providing forwarding information, and accessing recited in claim 1.

* * * * *